United States Patent Office 3,712,805
Patented Jan. 23, 1973

3,712,805
WEED CONTROL EMPLOYING N,N-DISUBSTITUTED AMINO ACID HERBICIDES
John Yates, Whistable, and David H. Payne, near Sittingbourne, England, assignors to Shell Oil Company, New York, N.Y.
No Drawing. Original application Dec. 28, 1967, Ser. No. 694,116, now Patent No. 3,598,859, dated Aug. 10, 1971. Divided and this application Aug. 21, 1970, Ser. No. 66,094
Int. Cl. A01n 9/24
U.S. Cl. 71—115        10 Claims

ABSTRACT OF THE DISCLOSURE

N,N-disubstituted amino acid derivatives such as N-benzoyl-N-(3,4-dichlorophenyl) alanine, herbicidal compositions containing them, and their use for controlling undesirable plant growth.

---

This is a division of application Ser. No. 694,116, filed Dec. 28, 1967, now U.S. Pat. No. 3,598,859.

This invention relates to novel herbicidal amino acid derivatives, to herbicidal compositions containing them and to a method of controlling undesirable plant growth with these derivatives.

Under modern methods of agriculture it has been found possible to leave cereal crops standing until full ripening of the ears has taken place. This was not the case formerly when harvesting was more dependent on weather conditions and took place over a longer period. Unfortunately wild oat matures more rapidly than grain crops and, when this weed is present, a proportion of its seeds are now shed into the soil before harvesting takes place; by this means serious infestation of arable land by wild oat has occurred. Moreover, it is very difficult to separate wild oat seeds from the seeds of other grain crops and the presence of wild oat in, for example, a sample of seed wheat seriously affects its merchantable quality. Attempts at chemical control of this pest have been made but up to now these have not been entirely successful. It has now been discovered that a new class of amino acid derivatives have useful selective herbicidal properties, and in particular give improved control of wild oat.

The novel amino acid derivatives of this invention are N,N-disubstituted amino acid derivatives of the formula (I) 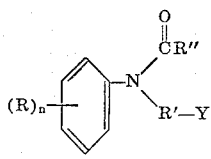

wherein R is halogen; nitro; alkyl; haloalkyl; alkenyl; alkoxy; aryl; aryloxy; aryl or aryloxy substituted with alkyl, halogen or nitro; —S—R°,

or

wherein R° is alkyl or aryl; n is an integer from 0–5, the R groups being the same or different when n is greater than 1; R' is alkylene; R" is alkyl; cycloalkyl; alkenyl; alkoxy; aryl; aryloxy; aryloxyalkyl aryl, arloxy or aryloxyalkyl substituted in the aromatic ring with alkyl, halogen or nitro —S—R°;

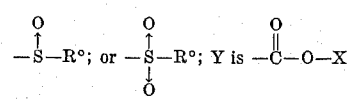

wherein X is alkali metal, hydrogen or alkyl; cyano; carbamoyl

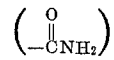

or mono- or di-N-alkylsubstituted carbamoyl.

When R or R" is alkyl, alkoxy, —S-alkyl,

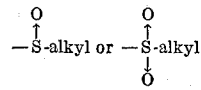

the alkyl moiety suitably has from 1–6 carbon atoms, preferably 1–4. Where R or R" is aryl, aryloxy, —S-aryl,

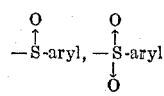

or aryl or aryloxy substituted with alkyl, halogen or nitro, the aryl moiety suitably has up to 10 carbon atoms, e.g., naphthyl, and preferably six, i.e., phenyl. The alkyl substituents on the aryl or aryloxy radicals may have 1–6 carbon atoms with 1–4 being preferred; the number of substituents, i.e., alkyl, halogen, nitro or combination thereof, being from one to a plurality with 1–2 being preferred.

The haloalkyl radical may contain from 1–6 carbon atoms with 1–4 being preferred; the number of halogen atoms may range from one to a plurality with 1–3 being preferred.

Where R" is aryloxyalkyl or aryloxyalkyl substituted in the aryl ring by alkyl, halogen or nitro, the aryl moiety suitably has up to 10 carbon atoms e.g., naphthyl, and preferably six, i.e., phenyl. The alkyl moieties, i.e., alkyl portion of the aryloxyalkyl group and any alkyl substituents on the aryl moiety of the aryloxyalkyl groups, suitably have from 1–6 carbon atoms with 1–4 preferred. The number of substituents, i.e., alkyl, halogen, nitro or combination thereof, may range from one to a plurality with 1–2 preferred.

All the alkyl moieties associated with the R and R" groups, e.g., alkyl, alkoxy, —S-alkyl, etc. may be branched-chain or straight-chain. While any of the halogens, i.e., fluorine, chlorine, bromine or iodine, are suitable, preferably any halogen present as defined for the R and R" groups is middle halogen, i.e., chlorine or bromine.

Where R" is cycloalkyl, it suitably has from 3–8 carbon atoms in the ring with 3–6 being preferred.

The alkenyl groups may contain from 2–8 carbon atoms with 3–5 being preferred.

While n may be 0, 1, 2, 3, 4 or 5 it is preferably 0, 1 or 2.

R' is suitably 1–6 carbon atoms with 1–4 being preferred and may be branched-chain or straight-chain alkylene.

When Y is

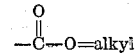

the alkyl may contain 1–10 carbon atoms and may be straight-chain or branched-chain; preferably the alkyl has from 1–4 carbon atoms.

When Y is

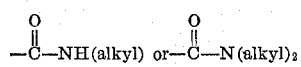

the alkyl may contain from 1–6 carbon atoms with 1–4 being preferred. The alkyl group may be branched-chain or straight-chain.

Of the N,N-disubstituted amino acid derivatives of Formula I, it appears that those having the highest herbicidal activity are those wherein R is bromine or chlorine, preferably chlorine, nitro, alkyl of 1–6 carbon atoms, preferably 1–4, perhaloalkyl of 1–4 carbon atoms, preferably trifluoromethyl, or alkoxy of 1–6 carbon atoms, preferably 1–4, and $n$ is 0, 1 or 2, the R groups being the same or different when $n$ is greater than 1; R' is alkylene of 1–6 carbon atoms, preferably 1–4 with ethylidene being most preferred; R'' is alkyl of 1–6 carbon atoms, preferably 1–4, cycloalkyl of 3–8, preferably 3–6 with cyclopropyl being most preferred, alkoxy of 1–6 carbon atoms, preferably 1–4, phenyl, phenoxyalkyl with the alkyl having from 1–4 carbon atoms or phenyl or phenoxyalkyl of 7–10 carbon atoms substituted in the phenyl ring by from one to a plurality, preferably 1–2, of middle halogen, preferably chlorine, nitro, alkyl of 1–4 carbon atoms or a combination thereof; and Y is

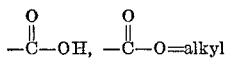

wherein the alkyl group has from 1–10 carbon atoms, preferably 1–4, or a mono-N-alkyl substituted carbamoyl wherein the alkyl has from 1–6 carbon with 1–4 preferred.

Within this subclass those N,N-disubstituted amino acid derivatives having the following formula appear to have the highest herbicidal activity;

(II)

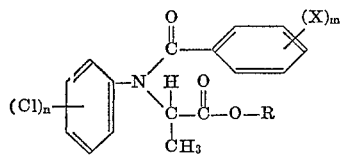

wherein $n$ is 1 or 2; R is hydrogen or ethyl; X is methyl, nitro or chlorine; and $m$ is 0 or 1. When $n$ is 2, the chlorine atoms are preferably substituted in the 3- and 4-positions.

The preferred species within this subclass are N-benzoyl-N-(3,4-dichlorophenyl) alanine and N-benzoyl-N-(3,4-dichlorophenyl) alanine ethyl ester.

It will be recognized that certain compounds of the invention contain an asymmetric carbon atom and hence may exist in two stereoisomeric forms. Both stereoisomeric forms, together with mixtures thereof, fall within the scope of this invention.

The N,N-disubstituted amino acid derivatives of this invention may be prepared by heating a mono-N-substituted amino acid derivative of the formula (III)

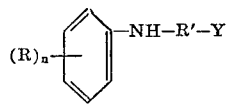

with an acyl compound of the formula (IV)          R''COQ wherein R, R' R'', Y and $n$ are as defined above, and Q represents a halogen atom or an acyloxy moiety of formula R''COQ. Preferably the reaction is carried out under reflux in an inert solvent, such as benzene or an alkanol, while convenient acyl compounds include anhydrides, such as acetic anhydride, and acyl chlorides such as benzoyl chloride and ethyl chloroformate.

Alternatively, when Y represents an N-alkyl carbamoyl group, the desired product can be obtained by treatment of the corresponding derivative in which Y is an alkoxycarbonyl group with the appropriate alkylamine, i.e., primary or secondary amine.

While the mono-N-substituted amino acid derivatives of Formula III may be prepared by conventional methods known in the art, it has been found that a particularly useful route for preparing those compounds wherein R' represents an ethylidene group is the reaction of an aniline derivative of formula (V)

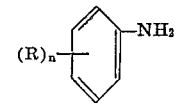

with a compound of formula:

(VI)         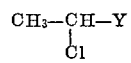

wherein R, Y and $n$ are as defined above. Since this reaction proceeds with the elimination of hydrogen chloride, it is preferably carried out in the presence of a base to absorb this by-product, an example of a suitable type of base being alkali metal bicarbonates. When it is desired to prepare a compound of Formula III in which Y represents an alkoxycarbonyl group, it may be desirable to effect the reaction in two stages by using a compound of Formula VI in which Y represents a carboxy group and subsequently esterifying the carboxylic acid product.

Thus, when applied to the preparation of the particularly preferred compound N-benzoyl-N-(3,4-dichlorophenyl)alanine ethyl ester, the preferred synthetic route comprises:

(1) Reaction of 3,4-dichloroaniline and 2-chloropropionic acid in the presence of sodium bicarbonate.
(2) Esterification of product from (1) with ethanol.
(3) Benzoylation with benzoyl chloride.

When the free acid is the desired product, this may be obtained by omitting stage (2).

The novel N,N-disubstituted amino acid derivatives of the invention may be used in the form of herbicidal compositions. These herbicidal compositions contain the conventional inert carriers, i.e., the liquid or solid agents normally associated with herbicidal compositions. They may also contain surface active agents.

The term carrier as used herein means a material, which may be inorganic or organic and of synthetic or natural origin, with which the active compound is mixed or formulated to facilitate its application to the plant, seed, soil or other object to be treated, or its storage, transport or handling. The carrier may be a solid or a fluid. Any of the material usually applied in formulating pesticides may be used as carrier.

Examples of suitable solid carriers are silicates, clays, for example, kaolinite clay, synthetic hydrated silicon oxides, synthetic calcium silicates, elements such as for example, carbon and sulfur, natural and synthetic resins such as for example, coumarone resins, rosin, copal, shellac, dammar, polyvinyl chloride and styrene polymers and copolymers, solid polychlorophenols, bitumen, asphaltite, waxes such as for example, beeswax, paraffin wax, montan wax and chlorinated mineral waxes, and solid fertilizers, for example superphosphates.

Examples of suitable fluid carriers are water, alcohols, such as for example, isopropanol, ketones such as for example, acetone, methyl ethyl ketone, methyl isobutyl ketone and cyclohexanone, ethers, aromatic hydrocarbons such as for example, benzene and toluene, petroleum fractions such as for example, kerosine, chlorinated hydrocarbons, such as for example, carbon tetrachloride, including liquefied normally vaporous gaseous compounds. Mixtures of different liquids are often suitable.

The surface active agent may be a wetting agent, an emulsifying agent or a dispersing agent; it may be nonionic or ionic. Any of the surface active agents usually applied in formulating herbicides may be used. Examples of suitable surface active agents are the sodium or calcium salts of polyacrylic acids, the condensation products of fatty acids or aliphatic amines or amides containing at least 12 carbon atoms in the molecule with ethylene oxide and/or propylene oxide; partial esters of the above fatty acids with glycerol, sorbitan, sucrose or pentaerythritol; condensation products of alkyl phenols, for example, p-octylphenol or p-octylcresol, with ethylene oxide and/or propylene oxide; sulfates or sulfonates of these condensation products; and alkali metal salts, preferably sodium salts, of sulfuric acid esters or sulfonic acids containing at least 10 carbon atoms in the molecule, for example, sodium lauryl sulfate, sodium secondary alkyl sulfates, sodium salts of sulfonated castor oil, and sodium alkylaryl sulfonates such as sodium dodecylbenzene sulfonate.

The compositions of the invention may be formulated as wettable powders, dusts, granules, solutions, emulsifiable concentrates, emulsions and pastes. Wettable powders are usually compounded to contain 25, 50 or 75% of toxicant and usually contain, in addition to solid carrier, 3–10% of a dispersing agent and, where necessary, 0–10% of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½–10% of toxicant. Granules are usually prepared to have a size between 10 and 100 BS mesh, and may be manufactured by agglomeration or impregnation techniques. Generally, granules will contain ½–25% toxicant and 0–25% of additives such as stabilizers, slow release modifiers, binding agents, etc. Emulsifiable concentrates usually contain, in addition to the solvent and, when necessary, co-solvent, 10–50% w./v. toxicant, 2–20% w./v. emulsifiers and 0–20% of appropriate additives such as stabilizers, penetrants and corrosion inhibitors. Pastes are compounded so as to obtain a stable, flowable product and usually contain 10–60% toxicant, 2–20% of appropriate additives and, as carrier, water or an organic liquid in which the toxicant is substantially insoluble.

The compositions of the invention may contain other ingredients, for example, protective colloids such as gelatin, glue, casein, gums and polyvinyl alcohol; sodium polyphosphates; cellulose ethers, stabilizers such as ethylene diamine tetra-acetic acid; other herbicides or pesticides; and stickers, for example non-volatile oils.

Aqueous dispersions and emulsions, compositions obtained by diluting a wettable powder or an emulsifiable concentrate according to the invention with water, also lie within the scope of the present invention. The said emulsions may be of the water-in-oil- or of the oil-in-water type, and may have a thick mayonnaise-like consistency.

The amount of the herbicide of this invention necessary to kill or inhibit the growth of plants is defined as the herbicidal amount. This quantity will obviously vary with the individual species of herbicide, the plant species, type of formulation, environmental conditions and the like. Those versed in the herbicide field, however, can readily determine the effective amount for a particular set of conditions.

The compounds of the invention exhibit plant growth regulant activity on species other than wild oat. For example, when used as a preemergence spray N-ethoxycarbonyl-N-(3,4-dichlorophenyl)alanine ethyl ester was found, 10 days after spraying, to have reduced the growth of linseed, mustard and sugar beet by half at an application rate equivalent to less than ½ lb./acre. Similarly, when used as a foliar spray N-acetyl-N-(3,4-dichlorophenyl)alanine ethyl ester was found, after the same interval, to have reduced the growth of the three species by half at application rates equivalent to 3.7 lb./acre, 1.2 lb./acre and 0.9 lb./acre, respectively.

Thus, the invention also includes a method of controlling weeds which comprises applying to the weeds or their habitat a compound according to the invention or a composition containing it, and also a method for improving the yields of crops at a locus which comprises applying to the locus a compound of the invention or a composition containing it.

The compounds according to the invention, their preparation, compositions containing them and their herbicidal activity are further illustrated by the examples which follow.

EXAMPLE I

Preparation of N-benzoyl-N-(3,4-dichlorophenyl) alanine ethyl ester

A mixture of N-(3,4-dichlorophenyl)alanine and ethyl ester (13.1 g.) and benzoyl chloride (7.0 g.) in benzene (50 ml.) was heated under reflux for 6 hours, during which time hydrogen chloride gas evolved. The solvent was removed under reduced pressure and the residual oil was purified by chromatography on an alumina column using diethyl ether as eluant solvent, to yield a product having a refractive index $n_D^{20}$ 1.5688. This product, on standing, yielded crystals having M.P. 50–52° C.

Analysis (percent by weight).—Found: C, 57.3; H, 4.1; N, 3.9; Cl, 19.8. $C_{17}H_{17}NO_3Cl_2$ requires (percent): C, 57.6; H, 4.8; N, 4.0; Cl, 20.1.

EXAMPLE II

Further preparation of N-benzoyl-N-(3,4-dichlorophenyl) alanine ethyl ester (a) Preparation of N-(3,4-dichlorophenyl)alanine.—To a solution of 3,4-dichloroalanine (2,686 g., i.e. 16.6 M) in isopropanol (8,400 ml.) were added water (500 ml.) and 2-chloropropionic acid (3,600 g., i.e. 33.2 M). This mixture was warmed to 40° C. and sodium bicarbonate (5,600 g., i.e. 66.4 M) was added in successive portions before heating under reflux for 113 hours.

After cooling the reaction mixture was poured into water (100 liters) and the unreacted 3,4-dichloroalanine removed by filtration. The filtrate was acidified to pH 3–4 with concentrated hydrochloric acid and the resultant precipitate filtered, washed and dried to yield N-(3,4-dichlorophenyl)alanine (2,455 g., i.e. 10.6 M), M.P. 148–149° C.

Analysis (percent by weight).— Found: C, 45.8; H, 3.8; Cl, 30.8. $C_9H_9NO_2Cl_2$ requires (percent): C, 46.3; H, 3.8; Cl, 30.5.

(b) Preparation of N - (3,4 - dichlorophenyl)alanine ethyl ester.—Hydrochloric acid gas was passed into a solution of N-(3,4-dichlorophenyl)alanine (2,475 g., i.e. 10.6 M) in absolute ethanol (10 liters) while heating under reflux for 6 hours. After allowing the mixture to stand overnight the bulk of the ethanol (ca. 8 liters) was removed under reduced pressure and the remaining solution poured into water (10 liters).

This aqueous solution was neutralized with sodium bicarbonate and extracted with methylene chloride (3 x 1 liter). The extract was washed, dried over anhydrous magnesium sulfate, and the solvent removed under reduced pressure to leave N-(3,4-dichlorophenyl)alanine ethyl ester as a red/brown oil. The product obtained in this manner was purified by triturating with hexane over an ice-bath to give a final yield of 2176 g., i.e. 8.3 M of the required compound, M.P. 37–38° C.

Analysis (percent by weight).—Found: C, 50.6; H, 5.1; Cl, 27.9. $C_{11}H_{13}NO_2Cl_2$ requires (percent): C, 50.4; H, 5.0; Cl, 27.0.

(c) Preparation of N-benzoyl-N-(3,4-dichlorophenyl) alanine ethyl ester.—A mixture of N-(3,4-dichlorophenyl) alanine ethyl ester (2176 g., i.e. 8.3 M), benzoyl chloride (1450 g., i.e. 10.4 M) and dry benzene (5 liters) was heated under reflux. After 4 hours a further portion of benzyl chloride (290 g., i.e. 2.1 M) was added and heating under reflux continued for an additional 20 hours.

After cooling the solvent was removed under reduced pressure to leave N-benzoyl-N-(3,4-dichlorophenyl)alanine ethyl ester as a dark brown oil. The product obtained in this manner was purified by triturating with hexane over an ice-bath to give a final yield of 2,220 g., i.e. 6.1 M of the required compound M.P. 50–52° C.

Analysis (percent by weight).—Found: C, 58.8; H, 4.5; Cl, 19.4. $C_{18}H_{17}NO_3Cl_2$ requires (percent): C, 59.0; H, 4.7; Cl, 19.4.

EXAMPLE III

Preparation of N-acetyl-N-(3,4-dichlorophenyl) alanine ethyl ester

A mixture of N-(3,4-dichlorophenyl)alanine ethyl ester (13.1 g.) and acetic anhydride (20 ml.) in acetic acid (50 ml.) was heated under reflux for 3 hours. The resultant dark-red solution was allowed to stand overnight before being poured into ice-water. The ice-water mixture was extracted with methylene chloride and the solvent extract was dried and distilled to yield N-acetyl-N-(3,4-dichlorophenyl)alanine ethyl ester, $n_D^{21}$ 1.5383, B.P. 147–148° C./0.4 mm. Hg.

*Analysis* (percent by weight).—Found: C, 51.3; H, 4.6; N, 4.8. $C_{13}H_{15}NO_3Cl_2$ requires (percent): C, 51.3; H, 4.9; N, 4.6.

EXAMPLE IV

Preparation of N-ethoxycarbonyl-N-(3,4-dichlorophenyl) alanine ethyl ester

A mixture of N-(3,4-dichlorophenyl)alanine ethyl ester (26.2 g.) and ethyl chloroformate (11.0 g.) in benzene (80 ml.) was heated under reflux for 6 hours, during which time hydrogen chloride gas evolved. Distillation of the reaction mixture under reduced pressure yielded N-ethoxycarbonyl-N-(3,4 - dichlorophenyl)alanine ethyl ester $n_D^{21}$ 1.5271, B.P. 150° C./0.35 mm. Hg.

*Analysis* (percent by weight).—Found: C, 50.4; H, 4.9; N, 4.7; Cl, 21.6. $C_{14}H_{17}NO_4Cl_2$ requires (percent): C, 50.3; H, 5.1; N, 4.2; Cl, 21.2.

EXAMPLE V

Preparation of N-benzoyl-N-(3,4-dichlorophenyl)alanine

N-benzoyl-N-(3,4-dichlorophenyl)alanine ethyl ester (10 g., prepared as in Example II) was stirred with a solution of sodium hydroxide (12 g.) in water (120 ml.) and methanol (50 ml.) at 60° C. for 3 hours. The resultant solution was filtered, evaporated to remove methanol, and acidified. The solid precipitate formed was then washed with water and crystallized from benzene/hexane to yield the free acid, M.P. 155–157° C.

*Analysis* (percent by weight).—Found: C, 56.8; H, 3.9; Cl, 20.9. Calculated for $C_{16}H_{13}NO_3Cl_2$ (percent): C, 56.8; H, 3.8; Cl, 21.1.

EXAMPLE VI

Preparation of 2-N-benzoyl-2-N-(3,4-dichlorophenyl)-N-methyl α-alaninamide

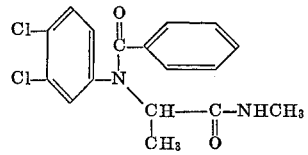

N-benzoyl-N-(3,4 - dichlorophenyl)alanine ethyl ester (5 g., prepared as in Example II) was dissolved in methanol (30 ml.), and methylamine dissolved in ethanol (5 ml.) was then added. After standing for 3 days the mixture was evaporated to dryness and the resultant oil extracted with petroleum ether to yield a solid which, after crystallization from benzene/hexane yielded the desired product, M.P. 163–165° C.

*Analysis* (percent by weight).—Found: C, 58.3; H, 4.5; Cl, 20.2. Calculated for $C_{17}H_{16}N_2O_2Cl_2$ (percent): C, 58.1; H, 4.6; Cl, 20.2.

EXAMPLE VII

Using methods similar to those described in Examples I–VI the compounds shown in Table I were prepared.

TABLE 1

| Name of compound | Physical properties, or M.P. refractive index | Found C | Found H | Found N | Found Cl | Calculated C | Calculated H | Calculated N | Calculated Cl |
|---|---|---|---|---|---|---|---|---|---|
| N-benzoyl-N-(4-chlorophenyl)alanine ethyl ester | $n_D^{21}$ 1.5620 | 65.0 | 5.7 | 4.1 | 11.4 | 65.2 | 5.4 | 4.2 | 10.7 |
| N-benzoyl-N-(3-chlorophenyl)alanine ethyl ester | $n_D^{21}$ 1.5588 | 64.7 | 5.6 | 4.2 | | 65.2 | 5.4 | 4.2 | |
| N-propionyl-N-(3,dichlorophenyl)alanine ethyl ester | $n_D^{21}$ 1.5307 | 53.0 | 5.2 | 4.5 | 22.7 | 52.8 | 5.3 | 4.4 | 22.4 |
| N-benzoyl-N-phenlalanine ethyl ester | $n_D^{21}$ 1.5536 | 72.7 | 6.6 | | | 72.7 | 6.4 | | |
| N-(4-chloro-2-methylphenoxyacetyl)-N-(3,4-dichlorophenyl)alanine ethyl ester | $n_D^{21}$ 1.5650 | 54.8 | 4.4 | 2.9 | 23.4 | 54.0 | 4.5 | 3.1 | 24.0 |
| N-benzoyl-N-(3,4-dichlorophenyl)glycine ethyl ester | $n_D^{21}$ 1.5734 | 57.3 | 4.4 | 3.7 | 20.4 | 57.0 | 4.3 | 4.0 | 20.2 |
| N-cyclopropanoyl-N-(3,4-dichlorophenyl)alanine ethyl ester | $n_D^{21}$ 1.5430 | 53.5 | 5.1 | 4.4 | 23.0 | 54.5 | 5.2 | 4.2 | 21.5 |
| N-benzoyl-N-(3,5-dichlorophenyl)-alanine ethyl ester | $n_D^{21}$ 1.5661 | 58.8 | 4.6 | 3.4 | | 59.0 | 4.6 | 3.8 | |
| N-benzoyl-N-(4-chloro-2-methylphenyl)-alanine ethyl ester | $n_D^{21}$ 1.5506 | 65.5 | 6.0 | | | 6.60 | 5.8 | | |
| N-benzoyl-N-(4-chlorophenyl)alanine | 152–153° C. | 63.5 | 4.7 | | 11.9 | 63.3 | 4.6 | | 11.7 |
| N-benzoyl-N-(4-n-butylphenyl)alanine ethyl ester | $n_D^{21}$ 1.5373 | 74.1 | 7.4 | 4.0 | | 74.8 | 7.7 | 3.9 | |
| N-benzoyl-N-(4-chloro-2-methoxyphenyl)alanine ethyl ester | 129–131° C. | 63.6 | 5.4 | 3.8 | 10.6 | 63.6 | 5.4 | 3.8 | 9.8 |
| N-(p-toluoyl)-N-(3,4-dichlorophenyl)alanine ethyl ester | 55–60° C. | 60.1 | 5.0 | 3.2 | 19.5 | 60.0 | 5.0 | 3.8 | 18.7 |
| N-(4-nitrobenzoyl)-N-(3,4-dichlorophenyl)alanine ethyl ester | $n_D^{21}$ 1.5740 | 52.5 | 4.4 | 6.2 | | 52.5 | 3.9 | 6.8 | |
| 2-(N-benzoyl-N-3-chloro-p-toluidine)amino-N-methylpropionamide | 146–147° C. | 65.2 | 5.7 | 7.8 | 11.3 | 65.5 | 5.6 | 8.4 | 10.7 |
| N-(4-chlorobenzoyl)-N-(3,4-dinitrophenyl)alanine ethyl ester | | 54.1 | 4.2 | | 26.2 | 53.9 | 4.0 | | 26.5 |
| N-(3-chlorobenzoyl)-N-(3,4-dichlorophenyl) alanine ethyl ester | $n_D^{185}$ 1.5660 | 53.9 | 4.2 | | 26.7 | 53.9 | 4.0 | | 26.5 |

EXAMPLE VIII

Demonstration of herbicidal activity

To demonstrate their herbicidal activity the compounds of the invention were tested as foliar sprays on seedling plants of the following representative species: maize (*Zea mays*), oat (*Avena sativa*), rye grass (*Lolium perenne*), pea (*Pisum sativum*), linseed (*Linum usitatissimum*), mustard (*Sinapsis alba*) and sugar beet (*Beta vulgaris*).

The formulations used consisted of 50 parts by volume of acetone, 50 parts by volume of water, 0.5 part by water of an alkylphenol/ethylene oxide condensate, available under the trade name Triton X-155, and a compound of the invention in varying amounts. These formulations were applied in a volume equivalent to 606 liters per hectare at dosage levels equivalent to 10 to 1 kilograms of active material per hectare.

Control tests were also carried out in which seedling plants were sprayed with the same volume of formulations from which the test compounds had been omitted.

The herbicidal effects of the compounds were assessed visually seven days after spraying the foliage and were recorded on a 0-9 scale (0=no effect and 9=very strong herbicidal effect). A rating 2 approximately corresponds to a reduction in fresh weight of stem and leaf of the treated plants of 25%, a rating 5 approximately corresponds to a reduction in weight of 55% and a rating 9 to a reduction in weight of 95%.

The results obtained in these tests are given in Table 2.

by dissolving the following components in N-methyl pyrrolidone and blending and filtering the resultant solution.

|  | G. |
|---|---|
| N-benzoyl-N-(3,4-dichlorophenyl)alanine ethyl ester | 20 |
| Tensiofix AS | 10 |
| Tensiofix D 120 | 10 |
| N-methyl pyrrolidone to 100 ml. | |

Tensiofix AS (Tensiofix is a trademark) is a blend of non-ionic polyethylene oxide condensate and anionic alkyl

TABLE 2

| Compound | Dosage, kg./ha.[a] | Phytotoxicity rating | | | | | | |
|---|---|---|---|---|---|---|---|---|
| | | Maize | Oat | Rye grass | Pea | Lin- seed | Mus- tard | Sugar beet |
| N-benzoyl-N-(3,4-dichlorophenyl)alanine ethyl ester | 10 | 3 | 6 | 3 | 4 | 9 | 7 | 5 |
| | 1 | 2 | 4 | 0 | 2 | 2 | 2 | 0 |
| N-benzoyl-N-(4-chlorophenyl)alanine ethyl ester | 10 | 3 | 6 | 0 | 0 | 5 | 7 | 4 |
| | 1 | 0 | 4 | | | 1 | 2 | 0 |
| N-benzoyl-N-(4-chloro-2-methylphenyl) alanine ethyl ester | 10 | 4 | 5 | 2 | 2 | 5 | 5 | 1 |
| | 1 | 2 | 3 | 0 | 0 | 0 | 0 | 0 |
| N-benzoyl-N-(4-chlorophenyl)alanine | 10 | 2 | 6 | 2 | 1 | 6 | 3 | 2 |
| | 1 | 0 | 4 | 0 | 0 | 2 | 0 | 0 |

[a] Kilograms/hectare.

EXAMPLE IX

Demonstration of growth regulant activity against wild oat

N-benzoyl-N-(3,4 - dichlorophenyl)alanine ethyl ester was dissolved in 50:50 v./v. acetone:water containing 0.5% of an alkyl aryl polyether alcohol and 1% glycerol. Using a logarithmic sprayer this solution was applied to the foliage of cultivated oats, wild oats and barley grown in a potting medium under glasshouse conditions.

The compound was sprayed at 7 dosage levels between 10 and 0.1 kg./ha. and phytotoxicity was recorded on an arbitrary scale 10 days after spraying. These phytotoxicity scores were transformed to growth inhibition percentages and plotted against dosage levels using a probit scale. The results obtained by this method of evaluation are given in Table 3.

TABLE 3

| Compound | Growth inhibi- tion, percent | Phytotoxicity dosage, kg./ha. | | |
|---|---|---|---|---|
| | | Wild oat | Barley | Culti- vated oat |
| N-benzoyl-N-(3,4-dichlorophenyl)- alanine ethyl ester | 10 | <0.2 | >10 | <0.2 |
| | 50 | 0.25 | | 0.42 |
| | 90 | >10 | | >10 |

EXAMPLE X

Preparation of an emulsifiable concentrate composition

An emulsifiable concentrate was prepared by dissolving the following components in mixed petroleum xylenes and blending and filtering the resultant solution.

|  | G. |
|---|---|
| N-benzoyl-N-(3,4-dichlorophenyl) alanine ethyl ester | 50 |
| Emcol H 702 | 10 |
| Mixed petroleum xylenes to 100 ml. | |

Emcol H 702 is a surface active agent.

EXAMPLE XI

Preparation of a water-miscible concentrate composition

A water-miscible concentrate composition was prepared sulfonate; Tensiofix D 120 (Tensiofix is a trademark) is an ethylene oxide/castor oil condensate.

We claim as our invention:

1. A herbicidal composition comprising an effective amount of:

(a) a compound of the formula

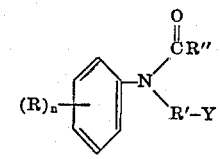

wherein R is chlorine, nitro, alkyl or 1-6 carbon atoms, perhaloalkyl of 1-4 carbon atoms or alkoxy of 1-6 carbon atoms; n is 0, 1 or 2; R' is alkylene of 1-6 carbon atoms; R" is alkyl of 1-6 carbon atoms, cycloalkyl of 3-8 carbon atoms, alkoxy of 1-6 carbon atoms, phenyl, phenoxyalkyl wherein the alkyl moiety has from 1-4 carbon atoms, or phenyl or phenoxyalkyl of 7-10 carbon atoms mono- or disubstituted in the phenyl ring by chlorine, nitro, alkyl of 1-4 carbon atoms or a combination thereof; and

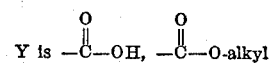

wherein the alkyl group has from 1-10 carbon atoms, or mono-N-alkyl substituted carbamoyl wherein the alkyl group has from 1-6 carbon atoms, and (b) an inert carrier therefor.

2. A herbicidal composition according to claim 1 wherein R is chlorine, nitro, alkyl of 1-4 carbon atoms, alkoxy of 1-4 carbon atoms; R' is ethylidene; R" is alkyl of 1-4 carbon atoms, cyclopropyl, alkoxy of 1-4 carbon atoms, phenyl, phenoxyalkyl wherein the alkyl moiety has from 1-4 carbon atoms, or phenyl or phenoxyalkyl of 7-10 carbon atoms mono- or disubstituted in the phenyl ring by chlorine, nitro, alkyl of 1-4 carbon atoms or a combination thereof; and Y is

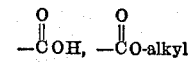

wherein the alkyl group has from 1-4 carbon atoms, or mono-N-alkyl substituted carbamoyl wherein the alkyl group has from 1-4 carbon atoms.

3. A herbicidal composition according to claim 2 wherein R is chlorine; $n$ is 1 or 2; R' is ethylidene and Y is —C(O)OR''' wherein R''' is H or ethyl, R'' is phenyl or phenyl substituted by one of methyl, nitro or chlorine.

4. A herbicidal composition according to claim 3 wherein $n$ is 2 and the two chlorine atoms are substituted at the 3- and 4-positions of the ring.

5. A herbicidal composition according to claim 4 wherein R''' is ethyl and R'' is phenyl.

6. A method for controlling the growth of plants which comprises contacting the plants with a herbicidal amount of a compound of the formula

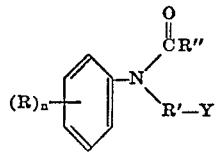

wherein R is chlorine, nitro, alkyl of 1-6 carbon atoms, perhaloalkyl of 1-4 carbon atoms or alkoxy of 1-6 carbon atoms; $n$ is 0, 1 or 2; R' is alkylene of 1-6 carbon atoms; R'' is alkyl of 1-6 carbon atoms, cycloalkyl of 3-8 carbon atoms, alkoxy of 1-6 carbon atoms, phenyl, phenoxyalkyl wherein the alkyl moiety has from 1-4 carbon atoms, or phenyl or phenoxyalkyl of 7-10 carbon atoms mono- or disubstituted in the phenyl ring by chlorine, nitro, alkyl of 1-4 carbon atoms or a combination thereof; and Y is

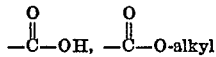

wherein the alkyl group has from 1-10 carbon atoms, or mono-N-alkyl substituted carbamoyl wherein the alkyl group has from 1-6 carbon atoms.

7. A method according to claim 6 wherein R is chlorine, nitro, alkyl of 1-4 carbon atoms, alkoxy of 1-4 carbon atoms; R' is ethylidene; R'' is alkyl of 1-4 carbon atoms, cyclopropyl, alkoxy of 1-4 carbon atoms, phenyl, phenoxyalkyl wherein the alkyl moiety has from 1-4 carbon atoms, or phenyl or phenoxyalkyl of 7-10 carbon atoms mono- or disubstituted in the phenyl ring by chlorine, nitro, alkyl of 1-4 carbon atoms or a combination thereof; and Y is

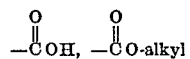

wherein the alkyl group has from 1-4 carbon atoms, or mono-N-alkyl substituted carbamoyl wherein the alkyl group has from 1-4 carbon atoms.

8. A method according to claim 7 wherein R is chlorine; $n$ is 1 or 2; R' is ethylidene and Y is —C(O)R''' wherein R''' is H or ethyl, R'' is phenyl or phenyl substituted by one of methyl, nitro or chlorine.

9. A method according to claim 8 wherein $n$ is 2 and the two chlorine atoms are substituted at the 3- and 4-positions of the ring.

10. A method according to claim 9 wherein R''' is ethyl and R''' is phenyl.

References Cited

UNITED STATES PATENTS

| | | | |
|---|---|---|---|
| 3,547,620 | 12/1970 | Olin | 71—118 |
| 3,567,776 | 3/1971 | Krenzer | 71—103 |
| 3,576,872 | 4/1971 | Singhal | 71—103 |

JAMES O. THOMAS, Jr., Primary Examiner

U.S. Cl. X.R.

71—98, 100, 103, 105, 111, 118